(12) United States Patent
Jaaskelainen et al.

(10) Patent No.: US 10,365,136 B2
(45) Date of Patent: *Jul. 30, 2019

(54) OPTO-ACOUSTIC FLOWMETER FOR USE IN SUBTERRANEAN WELLS

(71) Applicant: Halliburton Energy Services, Inc., Houston, TX (US)

(72) Inventors: Mikko Jaaskelainen, Houston, TX (US); Priyesh Ranjan, Houston, TX (US); Nitika Kalia, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 109 days.

This patent is subject to a terminal disclaimer.

(21) Appl. No.: 15/326,231

(22) PCT Filed: Aug. 20, 2014

(86) PCT No.: PCT/US2014/051878
§ 371 (c)(1),
(2) Date: Jan. 13, 2017

(87) PCT Pub. No.: WO2016/028289
PCT Pub. Date: Feb. 25, 2016

(65) Prior Publication Data
US 2017/0205260 A1 Jul. 20, 2017

(51) Int. Cl.
*G01F 1/66* (2006.01)
*E21B 47/10* (2012.01)
(Continued)

(52) U.S. Cl.
CPC ............... *G01F 1/66* (2013.01); *E21B 34/06* (2013.01); *E21B 47/101* (2013.01); *G01H 9/004* (2013.01);
(Continued)

(58) Field of Classification Search
CPC .............................. E21B 47/101; G01D 5/353
See application file for complete search history.

(56) References Cited

U.S. PATENT DOCUMENTS 3,405,770 A * 10/1968 Galle ........................ E21B 7/18
175/56
4,770,080 A * 9/1988 Jivoin ...................... G10D 7/02
84/330
(Continued)

FOREIGN PATENT DOCUMENTS

WO 03046333 A2 6/2003
WO 2013045941 A1 4/2013

OTHER PUBLICATIONS

International Search Report issued in corresponding PCT application No. PCT/US2014/051878, dated May 1, 2015, 3 pgs.

*Primary Examiner* — John Fitzgerald
(74) *Attorney, Agent, or Firm* — Chamberlain Hrdlicka

(57) ABSTRACT

An opto-acoustic flowmeter can include an optical waveguide and an emitter that emits acoustic energy in response to flow, the acoustic energy comprising a flow rate dependent parameter. A flow rate measuring method can include configuring an emitter so that flow into or out of a tubular string causes the emitter to emit acoustic energy, arranging an optical line so that the acoustic energy is received by an optical waveguide of the optical line, and detecting optical scatter in the optical waveguide. A well system can include multiple locations where fluid is flowed between an earth formation and a tubular string in a wellbore, multiple emitters that produce an acoustic vibration corresponding to a flow rate of the fluid, an optical line that receives the vibrations, and an optical interrogator that detects optical scatter in an optical waveguide of the line, the scatter being indicative of the vibrations.

13 Claims, 4 Drawing Sheets

(51) Int. Cl.
*E21B 34/06* (2006.01)
*G01H 9/00* (2006.01)
*E21B 43/16* (2006.01)
*E21B 43/20* (2006.01)
*E21B 43/24* (2006.01)
*E21B 43/26* (2006.01)
*E21B 34/00* (2006.01)

(52) U.S. Cl.
CPC ............ *E21B 43/168* (2013.01); *E21B 43/20* (2013.01); *E21B 43/2406* (2013.01); *E21B 43/26* (2013.01); *E21B 2034/007* (2013.01)

(56) References Cited

U.S. PATENT DOCUMENTS

| | | | | |
|---|---|---|---|---|
| 4,922,095 A * | 5/1990 | Gergely | ................. | G01D 5/344 250/225 |
| 5,418,335 A * | 5/1995 | Winbow | ................. | G01V 1/02 166/177.2 |
| 5,730,219 A | 3/1998 | Tubel et al. | | |
| 7,357,021 B2 * | 4/2008 | Blacklaw | ............ | E21B 47/0006 73/152.31 |
| 7,942,066 B1 * | 5/2011 | Stein | ..................... | G01F 1/8418 73/861.04 |
| 7,994,932 B2 * | 8/2011 | Huang | ................. | E21B 47/182 340/853.4 |
| 7,997,340 B2 * | 8/2011 | Bostick, III | ............ | E21B 21/08 166/250.01 |
| 8,020,616 B2 * | 9/2011 | Greenaway | ......... | E21B 47/0007 166/250.01 |
| 8,408,064 B2 * | 4/2013 | Hartog | ................. | E21B 47/101 73/643 |
| 8,584,519 B2 * | 11/2013 | Maida | .................. | E21B 47/16 73/152.54 |
| 8,612,154 B2 * | 12/2013 | Hsu | ........................ | G01V 1/44 702/11 |
| 8,893,785 B2 * | 11/2014 | Skinner | ................. | E21B 47/024 166/177.2 |
| 8,902,078 B2 * | 12/2014 | Vick, Jr. | ................. | E21B 47/14 340/854.3 |
| 9,003,874 B2 * | 4/2015 | Samson | .................. | E21B 47/16 73/152.54 |
| 9,222,828 B2 * | 12/2015 | Fripp | .................... | G01H 9/004 |
| 9,279,317 B2 * | 3/2016 | Lee | ....................... | G01H 13/00 |
| 9,388,685 B2 * | 7/2016 | Ravi | ..................... | E21B 47/101 |
| 9,447,679 B2 * | 9/2016 | Xiao | ..................... | E21B 47/123 |
| 9,664,035 B2 * | 5/2017 | Nyhavn | ............. | E21B 47/1015 |
| 9,823,373 B2 * | 11/2017 | Skinner | .................... | G01V 1/40 |
| 2002/0174728 A1 * | 11/2002 | Beresford | .............. | G01F 1/666 73/861 |
| 2003/0066652 A1 * | 4/2003 | Stegemeier | ............. | E21B 43/12 166/373 |
| 2004/0026076 A1 | 2/2004 | Goodwin et al. | | |
| 2004/0140092 A1 * | 7/2004 | Robison | .................. | E21B 29/02 166/255.1 |
| 2004/0141420 A1 * | 7/2004 | Hardage | ................. | E21B 47/00 367/149 |
| 2004/0194958 A1 * | 10/2004 | Mayeu | ..................... | E21B 34/14 166/255.1 |
| 2005/0067005 A1 * | 3/2005 | Van Der Spek | ........ | E21B 28/00 136/205 |
| 2005/0195687 A1 * | 9/2005 | Woo | .......................... | H04R 1/44 367/149 |
| 2005/0224229 A1 * | 10/2005 | Blacklaw | ............. | E21B 47/0006 166/253.1 |
| 2006/0165344 A1 * | 7/2006 | Mendez | ................... | E21B 47/06 385/13 |
| 2007/0220976 A1 * | 9/2007 | Ewerlin | ............... | G01N 29/036 73/579 |
| 2007/0272406 A1 * | 11/2007 | McCoy | ................... | E21B 43/126 166/250.01 |
| 2008/0291460 A1 * | 11/2008 | Khatchaturov | .... | G01D 5/35383 356/478 |
| 2009/0101432 A1 * | 4/2009 | Hsu | .......................... | G01V 1/44 181/102 |
| 2009/0266533 A1 * | 10/2009 | Baajiens | ............. | E21B 33/1208 166/66 |
| 2009/0326826 A1 * | 12/2009 | Hull | ..................... | E21B 47/1005 702/8 |
| 2010/0107754 A1 * | 5/2010 | Hartog | .................. | E21B 47/101 73/152.47 |
| 2010/0108313 A1 * | 5/2010 | Chan | ....................... | E21B 17/20 166/263 |
| 2010/0296100 A1 * | 11/2010 | Blacklaw | ............. | E21B 47/024 356/460 |
| 2011/0088462 A1 * | 4/2011 | Samson | ................... | E21B 47/10 73/152.18 |
| 2011/0280103 A1 * | 11/2011 | Bostick, III | .......... | E21B 47/101 367/35 |
| 2011/0290480 A1 * | 12/2011 | Al-Gouhi | ............. | E21B 33/124 166/250.12 |
| 2012/0013893 A1 * | 1/2012 | Maida | .................... | E21B 47/123 356/73.1 |
| 2012/0014211 A1 * | 1/2012 | Maida, Jr. | ............... | E21B 47/09 367/13 |
| 2012/0111104 A1 * | 5/2012 | Taverner | ................ | G01H 9/004 73/152.16 |
| 2012/0146805 A1 * | 6/2012 | Vick, Jr. | ............... | G01V 11/002 340/853.2 |
| 2012/0152562 A1 | 6/2012 | Newton et al. | | |
| 2013/0091942 A1 | 4/2013 | Samson et al. | | |
| 2013/0104642 A1 | 5/2013 | Pelletier et al. | | |
| 2014/0126331 A1 * | 5/2014 | Skinner | .................... | G01V 1/40 367/82 |
| 2014/0150523 A1 | 6/2014 | Stokely et al. | | |
| 2014/0260588 A1 * | 9/2014 | Jaaskelainen | ......... | E21B 47/101 73/152.32 |
| 2015/0021015 A1 * | 1/2015 | Xiao | ..................... | E21B 47/123 166/250.01 |
| 2015/0030187 A1 * | 1/2015 | Donaldson | ............... | H04R 9/06 381/165 |
| 2015/0135819 A1 * | 5/2015 | Petrella | .................... | G01V 1/40 73/152.58 |
| 2015/0323700 A1 * | 11/2015 | Jaaskelainen | ......... | G01V 13/00 73/1.85 |
| 2016/0061003 A1 * | 3/2016 | Gottumukkala | ....... | E21B 34/16 166/250.07 |
| 2016/0230542 A1 * | 8/2016 | Jaaskelainen | ......... | E21B 47/101 |
| 2017/0205260 A1 * | 7/2017 | Jaaskelainen | .......... | G01H 9/004 |
| 2017/0275986 A1 * | 9/2017 | Nunes | ..................... | G01H 9/004 |

* cited by examiner

(12) United States Patent
US 10,365,136 B2

OPTO-ACOUSTIC FLOWMETER FOR USE IN SUBTERRANEAN WELLS

TECHNICAL FIELD

This disclosure relates generally to equipment utilized and operations performed in conjunction with subterranean wells and, in one example described below, more particularly provides an opto-acoustic flowmeter for use in subterranean wells.

BACKGROUND

It can be beneficial to be able to measure flow rate in a well. In addition, if flow rate can be measured at multiple different locations along a wellbore, amounts of fluids being flowed into or out of the wellbore at the different locations can be determined. Such information can be used, for example, to balance production or injection along the wellbore, to prevent gas or water coning, to ensure conformance or stimulation operations are proceeding as desired, etc. Therefore, it will be appreciated that improvements are continually needed in the art of flow sensing in wells.

DETAILED DESCRIPTION

Figure 1:
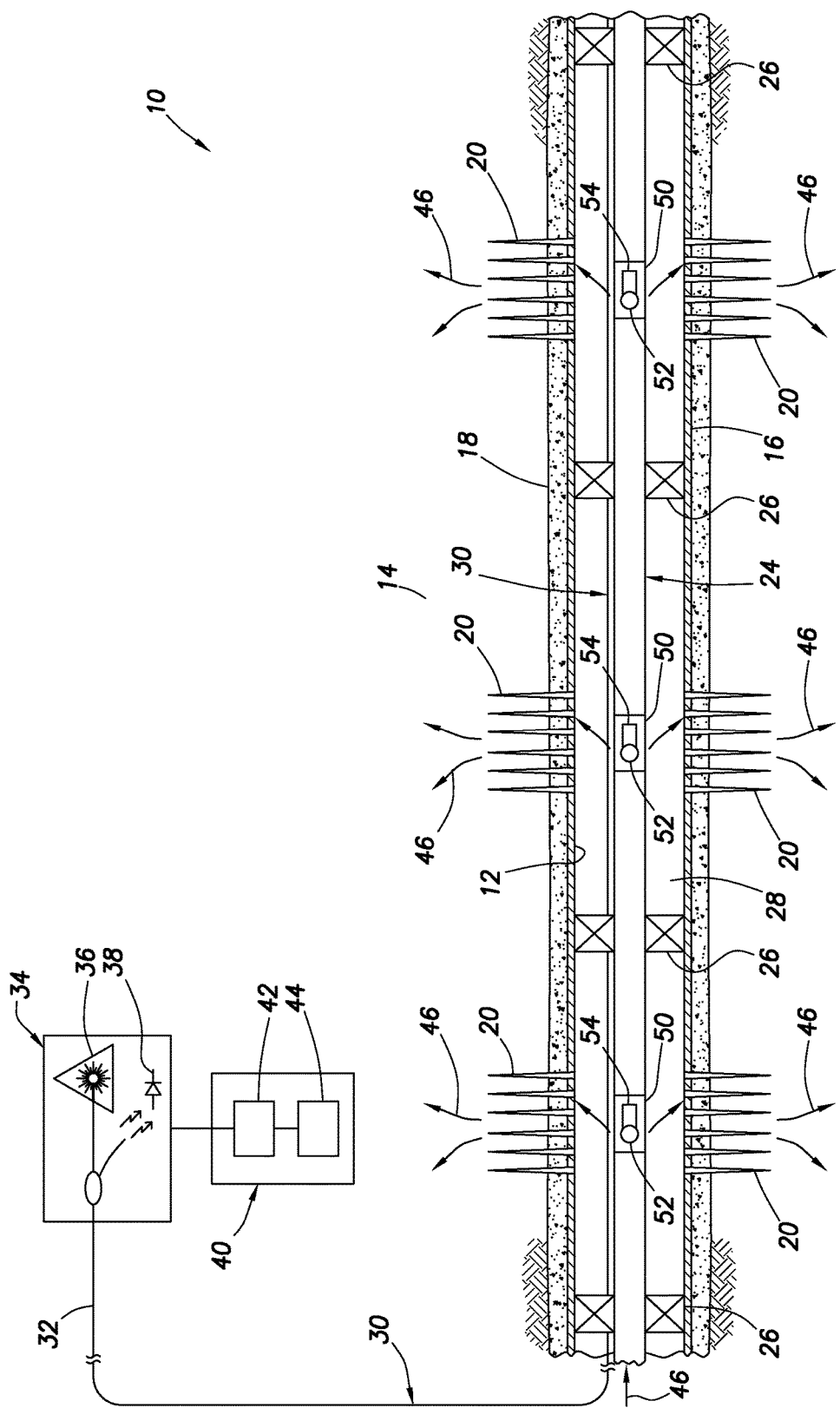
FIG. 1 is a representative partially cross-sectional view of a well system and associated method which can embody principles of this disclosure.

Representatively illustrated in FIG. 1 is a system 10 for use with a well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

As described more fully below, in the system 10 and method, acoustic emitters produce acoustic energy as fluid flows through or across the emitters. For example, a completion may have these acoustic emitters positioned at known locations where the acoustic energy is detected with an optical distributed acoustic sensing (DAS) system, with an optical line closely collocated with and/or coupled to the emitters.

Potential applications can include completions where liquids and/or gases are injected or produced through a controlled flow path at each of multiple locations. Injection examples include steam injection in steam assisted gravity drainage (SAGD) wells where steam is injected at multiple spaced apart locations simultaneously, enhanced oil recovery (EOR) applications with gas injection, matrix acidizing where an injection pressure is less that formation fracture pressure and determining flow distribution to different zones is a challenge, fluid diversion and conformance treatments, and water alternating gas (WAG) injections where there are multiple injection points from a common tubular string and it is desired to know a flow rate at each specific injection location. Using the principles of this disclosure, an inexpensive fit for purpose flow rate sensing system can be incorporated into an intelligent completion and/or any completion or other well installation that can accommodate the optical line and one or more acoustic emitters.

The acoustic emitters can be made out of erosion resistant materials and can be selected or configured for particular expected flow rates. The emitters can have specially configured channels with flow areas selected to control fluid flow velocity and flow regime, such that the DAS system can be used to determine flow rate based on the acoustic energy transmitted to the optical line.

The acoustic emitters can be configured so that they direct flow past acoustic signal generators. The flow can create acoustic energy that can be coupled to an optical waveguide interrogated by a DAS interrogator. Varying flow rates and/or multiple emitters may create a flow rate dependent acoustic emission that is indicative of the flow rate.

An acoustic emitter can be made with a number of different cavities designed to generate acoustic energy. Different cavities may be activated, and/or sizes of different cavities may be changed, based on the expected fluid flow rates. The cavities can be similar to flutes and/or whistles.

An emitter can be configured to direct flow through selected channels with certain flow areas to keep the flow velocity within a desired range of Reynolds numbers for a desired flow regime. The optical line can also be placed in this channel to be directly exposed to the flow. The flow would then generate acoustic energy that can be used to detect flow rate.

In the FIG. 1 example, a generally horizontal wellbore 12 penetrates an earth formation 14. The wellbore 12 is lined with casing 16 and cement 18. In other examples, the wellbore 12 could be inclined or vertical, and the principles of this disclosure could be practiced in an uncased or open hole section of the wellbore. Thus, the scope of this disclosure is not limited to any particular details of the wellbore 12 as depicted in FIG. 1 or described herein.

Perforations 20 are formed through the casing 16 and cement 18 at spaced apart locations along the wellbore 12. The perforations 20 provide for fluid communication between the wellbore 12 and the formation 14 at the spaced apart locations. In other examples, casing valves or other equipment may be used for providing fluid communication between the wellbore 12 and the formation 14.

A generally tubular injection string 24 is positioned in the wellbore 12. Packers 26 are used to isolate separate sections of an annulus 28 formed between the injection string 24 and the wellbore 12.

An optical line 30 also extends through the packers 26 and extends through the wellbore 12. The optical line 30 includes therein at least one optical waveguide 32 (such as, an optical fiber or an optical ribbon), and may include other lines (such as, electrical and/or hydraulic lines), strength members, etc.

The optical line 30 may be in the form of a cable. The optical line 30 may be armored or enclosed in a protective covering (such as, in a metal tube).

The optical line 30 could be internal or external to, or positioned in a wall of, any tubular string (such as, the casing 16, and/or injection string 24). The scope of this disclosure is not limited to any particular form, configuration or position of the optical line 30 in a well.

In the FIG. 1 example, the optical waveguide 32 is optically connected to an optical interrogator 34. The optical interrogator 34 is depicted schematically in FIG. 1 as including an optical source 36 (such as, a laser or a light emitting diode) and an optical detector 38 (such as, an opto-electric converter or photodiode).

The optical source 36 launches light (electromagnetic energy) into the waveguide 32, and light returned to the interrogator 34 is detected by the detector 38. Note that it is not necessary for the light to be launched into a same end of the optical waveguide 32 as an end via which light is returned to the interrogator 34.

Other or different equipment (such as, an interferometer or an optical time domain or frequency domain reflectometer) may be included in the interrogator 34 in some examples. The scope of this disclosure is not limited to use of any particular type or construction of optical interrogator.

A computer 40 is used to control operation of the interrogator 34, and to record optical measurements made by the interrogator. In this example, the computer 40 includes at least a processor 42 and memory 44. The processor 42 operates the optical source 36, receives measurement data from the detector 38 and manipulates that data. The memory 44 stores instructions for operation of the processor 42, and stores processed measurement data. The processor 42 and memory 44 can perform additional or different functions in keeping with the scope of this disclosure.

In other examples, different types of computers may be used, the computer 40 could include other equipment (such as, input and output devices, etc.). The computer 40 could be integrated with the interrogator 34 into a single instrument. Thus, the scope of this disclosure is not limited to use of any particular type or construction of computer.

The optical waveguide 32, interrogator 34 and computer 40 may comprise a distributed acoustic sensing (DAS) system capable of detecting acoustic energy as distributed along the optical waveguide. For example, the interrogator 34 can be used to measure Brillouin or coherent Rayleigh scattering in the optical waveguide 32 as an indication of acoustic energy as distributed along the waveguide.

In addition, a ratio of Stokes and anti-Stokes components of Raman scattering in the optical waveguide 32 could be monitored as an indication of temperature as distributed along the waveguide. In other examples, Brillouin scattering may be detected as an indication of temperature as distributed along the optical waveguide 32.

In further examples, fiber Bragg gratings (not shown) could be closely spaced apart along the optical waveguide 32, so that strain in the waveguide will result in changes in light reflected back to the interrogator 34. An interferometer (not shown) may be used to detect such changes in the reflected light.

As depicted in FIG. 1, a fluid 46 is injected into the formation 14 via the injection string 24. For example, the fluid 46 could be a gas, steam, heated water, combinations thereof, etc. In other examples, the fluid 46 could be produced from the formation 14, in which case the fluid could comprise oil, gas, water, combinations thereof, etc. The scope of this disclosure is not limited to any particular fluid or combination of fluids injected into, or produced from, the formation 14.

The injection string 24 includes multiple flow control devices 50 (such as, sliding sleeve valves, chokes, interval control valves, etc.) at spaced apart locations for selectively permitting fluid communication between an interior and an exterior of the injection string via ports 52. In the FIG. 1 example, the ports 52 allow the injection fluid 46 to flow from the interior of the injection string 24 into isolated sections of the annulus 28.

In the example depicted in FIG. 1, acoustic emitters 54 are incorporated into or positioned adjacent to or proximate the flow control devices 50 and ports 52. In this manner, the emitters 54 will produce acoustic vibration in response to flow of the fluid 46. The vibration at each location of the emitters 54 will be detected using the optical line 30, and it will thus be possible to determine or at least estimate a flow rate of the fluid 46 at each of the emitter locations.

Figure 2:
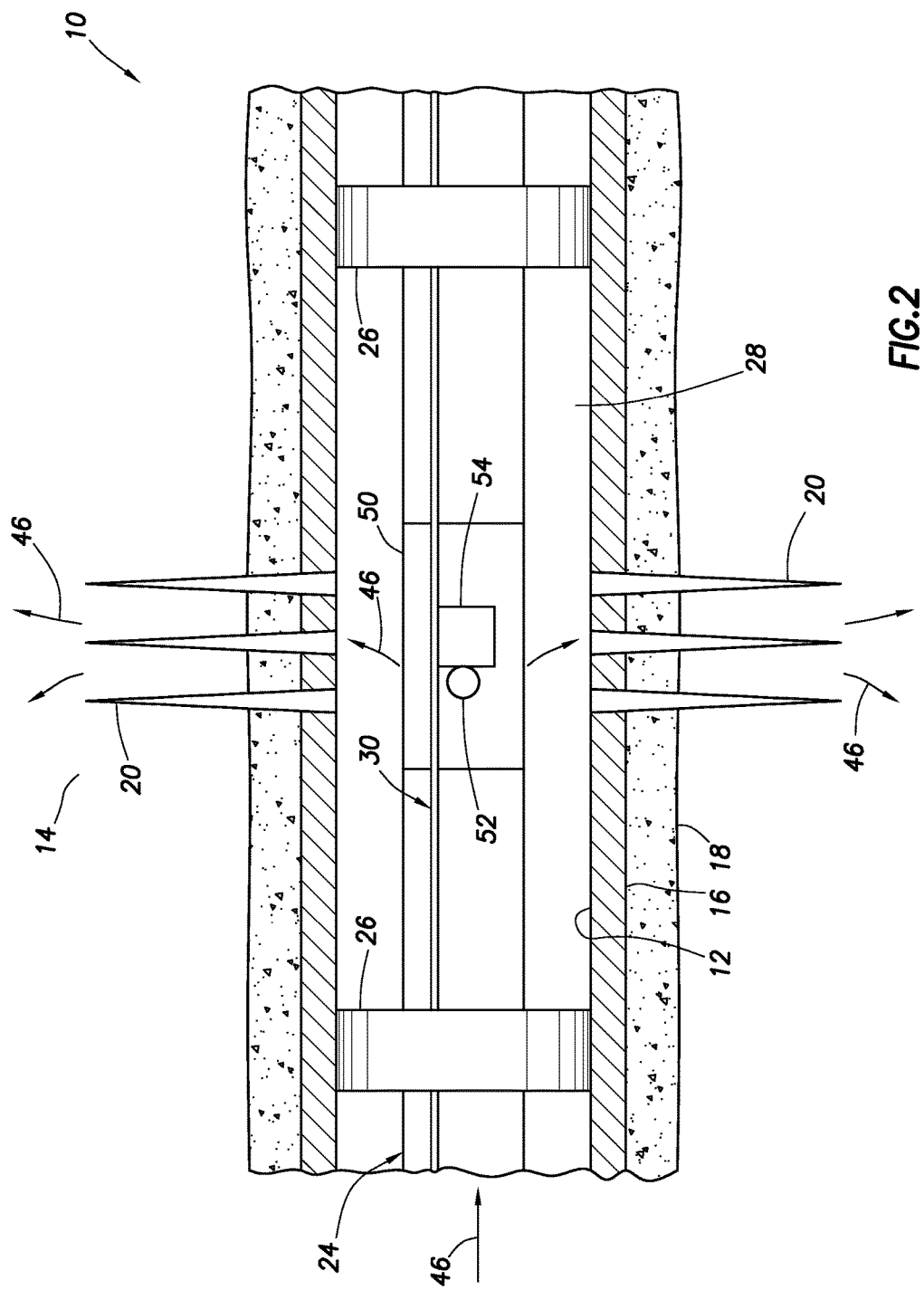
FIG. 2 is a representative partially cross-sectional view of a section of another example of the system and method.

Referring additionally now to FIG. 2, an enlarged scale partially cross-sectional view of another example of the system 10 is representatively illustrated. In this example, an acoustic emitter 54 is positioned adjacent a flow control device 50 and a port 52 thereof. Although only one flow control device 50 and one port 52 are shown in FIG. 2, any number may be used in keeping with the scope of this disclosure.

As depicted in FIG. 2, the optical line 30 is in contact with the emitter 54. In this manner, coupling of vibration from the emitter 54 to the optical line 30 is enhanced. In some examples, the optical line 30 could extend through the emitter 54 (such as, in flow channels thereof) for enhanced vibration coupling, or to allow the optical waveguide 32 (see FIG. 1) to be directly vibrated by the flow through the emitter.

Figure 3:
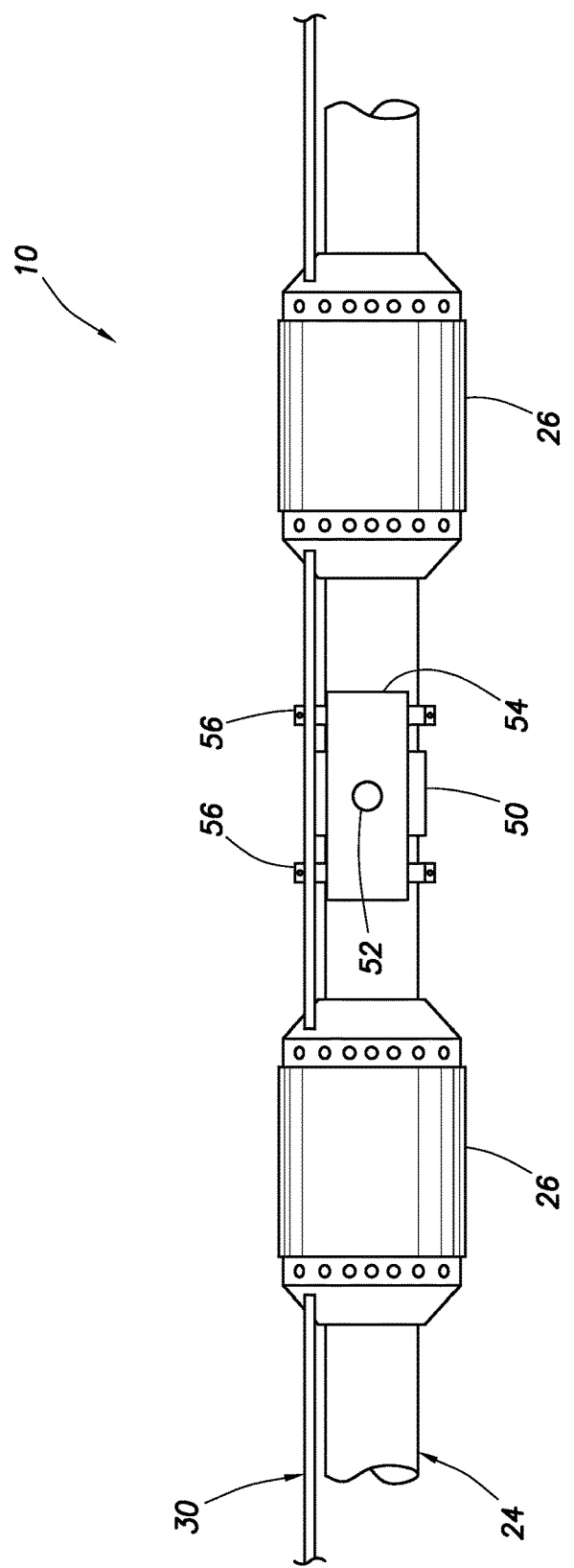
FIG. 3 is a representative more detailed side view of a tubular string of the system.

Referring additionally now to FIG. 3, a more detailed side view of a section of the tubular string 24 is representatively illustrated. In this view, a manner in which the optical line 30 and acoustic emitter 54 can be clamped to the tubular string 24 is depicted. Specifically, clamps 56 may be used for this purpose. In other examples, the acoustic emitter 54 may be incorporated into the flow control device 50, so that the emitter is not separately clamped to the tubular string 24.

Figure 4:
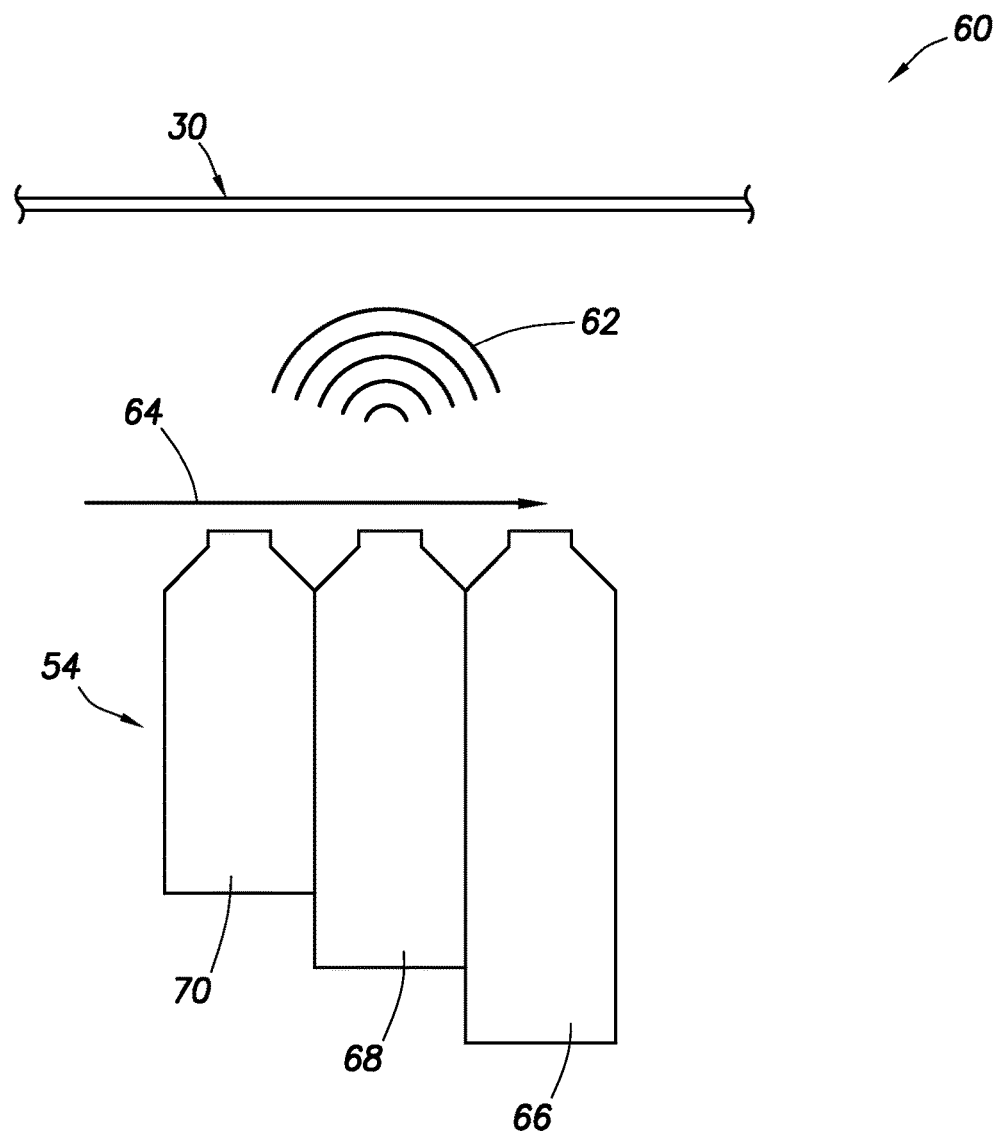
FIG. 4 is a representative schematic view of an acoustic emitter and an optical line that may be used as an opto-acoustic flowmeter in the system and method.

Referring additionally now to FIG. 4, an opto-acoustic flowmeter 60 that may be used with the well system 10 and method described above is representatively illustrated. However, the flowmeter 60 may be used with other systems and methods, and other configurations of flowmeters may be used, in keeping with the principles of this disclosure.

In the flowmeter 60 of FIG. 4, the optical line 30 is positioned in a same wellbore, adjacent, proximate or in contact with, the acoustic emitter 54. The emitter 54 produces vibration 62 in response to fluid flow 64 across or through the emitter. For example, in the system 10 examples of FIGS. 1-4, the flow 64 could comprise flow of the injection fluid 46, or the flow could comprise a production fluid flow.

The vibration 62 has at least one parameter that corresponds to a rate of the flow 64. For example, an amplitude and/or a frequency of the vibration 62 could correspond to a rate of the flow 64. In one example, the amplitude and/or the frequency could increase in response to an increase in the rate of the flow 64.

In the FIG. 4 example, the emitter 54 has multiple chambers 66, 68, 70. Each of the chambers 66, 68, 70 has a resonant frequency. For example, a longer chamber 66 can have a lower resonant frequency as compared to a shorter chamber 70.

When the flow 64 passes across the chambers 66, 68, 70, one or more of the chambers can vibrate at its resonant frequency (or a harmonic frequency), depending on the rate or velocity of the flow. The chambers 66, 68, 70 can be configured or selected, so that they produce detectable acoustic vibrations at expected downhole conditions, flow rates, etc. Similarly, the emitter 54 can be configured with appropriately sized channels, flow passages, etc., so that the flow 64 has an appropriate rate or velocity to produce detectable acoustic vibrations from the chambers 66, 68, 70.

Note that the emitter 54 example of FIG. 4 is merely illustrative of one way in which the vibration 62 may be produced, and a large variety of other ways are possible in keeping with the scope of this disclosure. For example, bluff bodies, vortex shedding structures, vanes, and any other type of structure or device may be used to produce the vibration 62.

It may now be fully appreciated that the above disclosure provides significant advancements to the art of flow sensing in wells. In some examples described above, a flow rate of fluid produced from or injected into the formation 14 can be conveniently measured using a distributed acoustic sensing system. Such flow rate measurement can be performed at multiple locations along the wellbore 12, thereby enabling injection and/or production parameters to evaluated, and adjusted if desired.

In particular, the above disclosure provides to the art an opto-acoustic flowmeter 60. In one example, the flow meter 60 can comprise: an optical waveguide 32; and an acoustic emitter 54 that emits acoustic energy in response to flow, and wherein the acoustic energy comprises at least one parameter that is flow rate dependent.

The parameter may be a frequency and/or an amplitude of an acoustic vibration.

The optical waveguide 32 may be connected to an optical interrogator 34 that detects optical scatter in the waveguide 32.

The acoustic emitter 54 may include multiple chambers 66, 68, 70, the chambers having different lengths.

The optical waveguide 32 may be included in an optical line 30 in contact with the acoustic emitter 54.

The acoustic emitter 54 may be incorporated into a flow control device 50.

A method of measuring flow rate in a subterranean well is also provided to the art by the above disclosure. In one example, the method can comprise: configuring an acoustic emitter 54 so that flow 64 between an interior and an exterior of a tubular string 24 causes the acoustic emitter 54 to emit acoustic energy; arranging an optical line 30 so that the acoustic energy emitted by the acoustic emitter 54 is received by an optical waveguide 32 of the optical line 30; and detecting optical scatter in the optical waveguide 32.

The arranging step can include extending the optical line 30 along a wellbore 12. The arranging step can include attaching the optical line 30 to the tubular string 24.

The configuring step can include providing multiple chambers 66, 68, 70 in the acoustic emitter 54. The configuring step can include incorporating the acoustic emitter 54 into a flow control device 50. The configuring step can include positioning the acoustic emitter 54 so that the flow 64 passes through the acoustic emitter 54.

A parameter of the acoustic energy may vary in response to a change in the flow rate. The parameter may be selected from the group consisting of frequency and amplitude.

A well system 10 is also described above. In one example, the well system 10 can comprise: multiple locations where fluid 46 is flowed between an earth formation 14 and a tubular string 24 in a wellbore 12 that penetrates the formation 14; multiple acoustic emitters 54, wherein each of the acoustic emitters 54 produces an acoustic vibration 62 corresponding to a flow rate of the fluid 46 at a corresponding one of the locations; an optical line 30 that receives the acoustic vibrations from the acoustic emitters 54; and an optical interrogator 34 that detects optical scatter in an optical waveguide 32 of the optical line 30, the optical scatter being indicative of the acoustic vibrations 62 produced by the acoustic emitters 54.

Each of the acoustic emitters 54 may include multiple chambers 66, 68, 70, the chambers having different lengths. Each of the acoustic emitters 54 may be incorporated into a respective flow control device 50.

The acoustic vibrations 62 may comprise at least one parameter that is flow rate dependent. The parameter may be selected from the group consisting of frequency and amplitude.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. An opto-acoustic flowmeter, comprising:
an optical waveguide; and
a multi-chamber acoustic emitter that emits acoustic energy at a resonance frequency of a chamber of the multi-chamber acoustic emitter in response to a transverse flow across each chamber of the multi-chamber acoustic emitter simultaneously, wherein each chamber of the multi-chamber acoustic emitter has a uniform cross-sectional area and a length that is different than the remaining chambers, and the chamber of the multi-chamber acoustic emitter that produces the acoustic energy at a resonance frequency varies based on a flow rate of the flow across the multi-chamber acoustic emitter, and wherein the acoustic energy comprises at least one parameter that is flow rate dependent.

2. The flowmeter of claim 1, wherein the amplitude of the acoustic energy is flow rate dependent.

3. The flowmeter of claim 1, wherein the optical waveguide is connected to an optical interrogator that detects optical scatter in the waveguide.

4. The flowmeter of claim 1, wherein the optical waveguide is included in an optical line in contact with the acoustic emitter.

5. The flowmeter of claim 1, wherein the acoustic emitter is incorporated into a flow control device.

6. A method of measuring flow rate in a subterranean well, the method comprising:
  positioning a multi-chamber acoustic emitter between an interior and an exterior of a tubular string causes the acoustic emitter to emit acoustic energy;
  flowing fluid transversely across each chamber of a multi-chamber acoustic emitter simultaneously to produce vibration at a resonance frequency of a chamber of the multi-chamber acoustic emitter, wherein a cross-sectional area of each chamber is uniform and a length of each chamber is different than the remaining chambers, and the chamber of the multi-chamber acoustic emitter that produces the resonance frequency vibration varies based on a flow rate of the flow across the multi-chamber acoustic emitter;
  arranging an optical line, wherein the acoustic energy emitted by the acoustic emitter is received by an optical waveguide of the optical line; and
  detecting optical scatter in the optical waveguide; and
  determining a flow rate of the flow based on the optical scatter.

7. The method of claim 6, wherein the arranging further comprises extending the optical line along a wellbore.

8. The method of claim 6, wherein the arranging further comprises attaching the optical line to the tubular string.

9. The method of claim 6, wherein the configuring further comprises incorporating the acoustic emitter into a flow control device.

10. The method of claim 6, wherein an amplitude of the acoustic energy varies in response to a change in the flow rate.

11. A well system, comprising:
  multiple locations where fluid is flowed between an earth formation and a tubular string in a wellbore that penetrates the formation;
  multiple multi-chamber acoustic emitters, each multi-chamber acoustic emitter producing acoustic vibration at a resonance frequency of a chamber of the respective multi-chamber acoustic emitter in response to a transverse flow across each chamber of the respective multi-chamber acoustic emitter simultaneously, wherein the respective chambers of each multi-chamber acoustic emitter have a uniform cross-sectional area and a length that is different than the remaining chambers, and the chamber of each multi-chamber acoustic emitter that produces the resonance frequency acoustic vibration varies based on a flow rate of the flow across the respective multi-chamber acoustic emitter;
  an optical line that receives the acoustic vibrations from the acoustic emitters; and
  an optical interrogator that detects optical scatter in an optical waveguide of the optical line, the optical scatter being indicative of the acoustic vibrations produced by the acoustic emitters.

12. The system of claim 11, wherein each of the acoustic emitters is incorporated into a respective flow control device.

13. The system of claim 11, wherein an amplitude of the acoustic vibrations is flow rate dependent.

* * * * *